Figure 3:
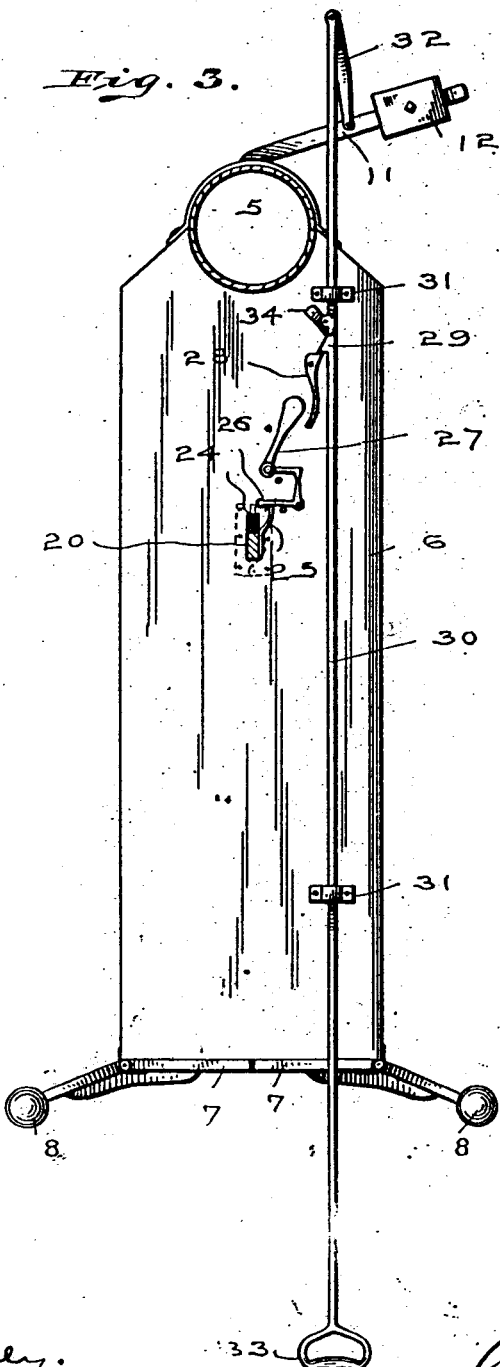

(No Model.) 2 Sheets—Sheet 1.
A. SCHULZE.
AUTOMATIC WEIGHING SCALE.
No. 542,284. Patented July 9, 1895.
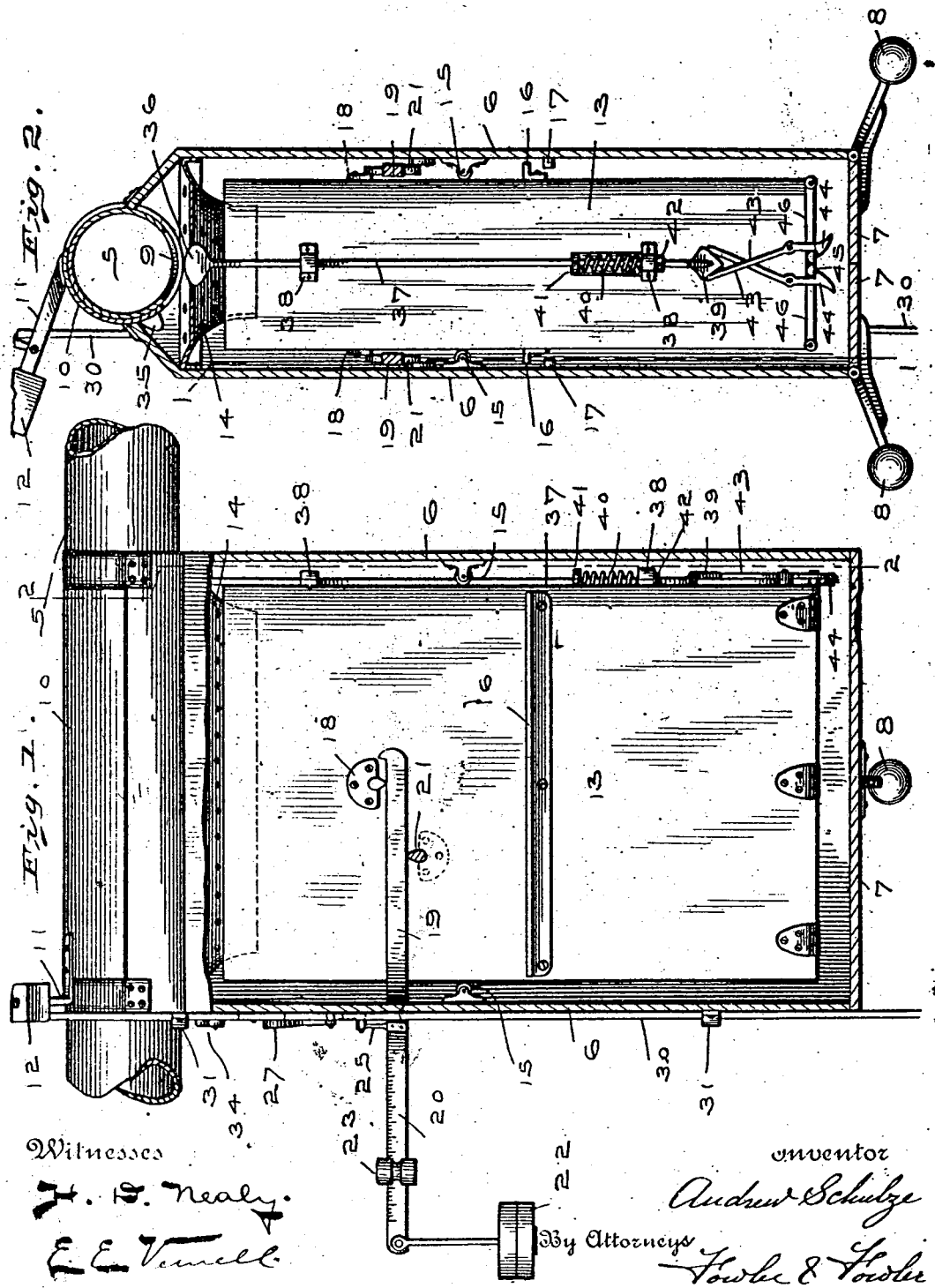

(No Model.) 2 Sheets—Sheet 2.

A. SCHULZE.
AUTOMATIC WEIGHING SCALE.

No. 542,284. Patented July 9, 1895.

Witnesses
H. A. Nealy.
E. E. Vennell

Inventor
Andrew Schulze
By Attorneys
Fowler & Fowler

UNITED STATES PATENT OFFICE.

ANDREW SCHULZE, OF LOTT, TEXAS, ASSIGNOR TO THE KINGSLAND & DOUGLAS MANUFACTURING COMPANY, OF ST. LOUIS, MISSOURI.

AUTOMATIC WEIGHING-SCALE.

SPECIFICATION forming part of Letters Patent No. 542,284, dated July 9, 1895.

Application filed October 8, 1894. Serial No. 525,209. (No model.)

*To all whom it may concern:*

Be it known that I, ANDREW SCHULZE, a citizen of the United States, residing at Lott, county of Falls, and State of Texas, have invented a certain new and useful Automatic Weighing-Scale for Cotton, of which the following is such a full, clear, and exact description as will enable any one skilled in the art to which it appertains to make and use the same, reference being had to the accompanying drawings, forming part of this specification.

My invention relates to a scale or weighing-machine which is particularly adapted to be connected to a pneumatic conveyer at any point for weighing cotton, grain, or any other product. It is one that is automatic in operation, weighing any amount to which its scale may be set, and then cutting off the supply and emptying itself, when it may be reset, preferably by hand, to repeat the weighing operation.

The invention consists in features and combinations pointed out in the claims at the end of this specification.

In the drawings, where a machine is shown whose details I have found most practical up to this time, Figure 1 is a vertical sectional view taken through the outer casing of the scale on the line 1 1 of Fig. 2, the weighing-box being in elevation. Fig. 2 is a cross-sectional view on the line 2 2 of Fig. 1, the weighing-box being in elevation. Fig. 3 is an end view of the scale, the scale-beam being cut off or in section.

In all the drawings, where similar indicating-marks refer to the same parts, 5 represents a pneumatic tube or pipe, through which cotton, grain, &c., are pneumatically conveyed, preferably by an exhaust-fan.

6 is the outer casing or shell of the scale, which is connected to the pipe 5 at any desired point, the casing having hinged doors 7 in its bottom, and an arm on each door carrying a weight 8, which counterbalances the doors and allows them to be opened or shut with very little effort.

9 is an opening in the pipe 5, through which drops the cotton or other staple to be weighed, this opening being closed through the sliding door or valve 10, having an arm 11 connected to it, with an adjustable weight 12 on its end, the operation of which will be hereinafter described.

13 is the weighing-receptacle, which is of nearly the size as the shell or casing 6 and has an open top immediately beneath the opening 9 in the pneumatic pipe 5, and 14 is a hopper or funnel secured to the sides of the casing 6, which prevents any cotton from dropping between such casing and the weighing-receptacle.

15 are cquers pivoted in brackets secured to the inner sides of the casing 6 and bearing on the sides of the receptacle 13, thereby holding such receptacle centrally in the casing 6 and preventing it from tipping.

16 are brackets secured to the sides of the weighing-receptacle, and 17 are stops on the casing 6, which limit the downward movement of such receptacle.

18 are knife-edges formed on brackets secured one on each side of the weighing-receptacle 13, the knife-edges resting on the arms or on the bifurcated ends 19 of the scale-beam 20, these being supported from knife-edges formed on brackets secured to the inside of the outer casing 6.

22 are the scale-weights which are carried on the end of the beam 20, and 23 is the sliding or balancing-weight.

The scale-beam extends through a slot 24 in the end of the outer casing 6 and just outside of such casing has attached to it the trip 25, which engages with the under side of the pivoted trigger 26. 27 is a weighted lever pivoted to the casing 6, and its lower or bent end normally rests on such trigger.

28 is a pivoted trip which normally engages with a tooth or projection 29 on the side of the vertical bar or rod 30, which works in brackets 31 on the end of the casing 6. The upper end of bar 30 is pivoted to a link 32, in turn pivoted to the arm 11, which is connected to and operates the valve 10 of the pneumatic pipe 5.

33 is a handle on the lower end of the rod or bar 30 for opening the valve 10 after it has been closed through its weighted arm 12.

On the outside of the rod 30, just above its tooth or projection 29, is a pivoted dog or pawl 34 for resetting the weighted lever 27 after the valve has been closed and when it is to be opened again, the pawl slipping over the weighted lever as the rod 30 goes down, but engaging with and lifting such lever as the rod 30 goes up.

35 is a projection on the valve 10 at one end thereof and moves across the opening 9 and as the valve closes is adapted to make contact with and move the rounded head 36 of the vertical rod 37, which works in brackets 38 on the end of the weighing-receptacle 13 and has a pointed head 39 on its lower end with two beveled faces or edges.

The rod 37 is normally held in a raised position by a spring 40, coiled around it between the lower bracket 38 and a fixed collar 41 on the rod, a collar 42 being also secured to the rod under the bracket 38 for limiting the upward movement of such rod.

43 are trip-arms which are pivoted to and near the lower end of the weighing-receptacle, the arms crossing each other and lying in such position as to make contact with the beveled edges of the head 39 on the end of the rod 37. The lower ends of the trip-arms 43 have hooks or latches 44 on their lower ends, which are adapted to engage with projections 45 on the hinged doors 46 in the bottom of the weighing-receptacle, and thereby hold such doors closed, the hooks having beveled or rounded ends, so that as the doors are closed their projections will readily engage with the hooks 44 of the trip-arms 43.

The several parts of my automatic scale being in the position shown in the drawings, upon cotton or other product being drawn through the pneumatic tube 5 by a suction fan, we will suppose a partial vacuum will be created in the outer casing 6 of the scale. This will not affect in any way the weighing-receptacle 13, as the air-pressure all around it is the same.

We will suppose that cotton is being weighed. It is drawn through the pipe 5 until it reaches the opening 9 in such pipe, where it will drop through the same and into the weighing-receptacle 13. Suppose the scale be set at the one-hundred-pound mark. When that amount of cotton has dropped into the weighing-receptacle, the scale-beam will tip, and, the outer end of such beam raising, its trip 25 will move the trigger 26 upward, releasing it from engagement with the weighted arm 27, allowing such arm to drop. As it falls it will strike the lower end of the trip 28, releasing such trip from engagement with the rod 30, and allow such rod to drop or move downward in its brackets. This rod being connected to the valve-arm 11 by the link 32, the valve-arm will also fall and thus close the valve 10, cutting off any further supply of cotton to the weighing-receptacle. As the valve 10 closes, its projection 35 strikes the rounded head of the rod 37 on the end of the weighing-receptacle, moving such rod downward and causing its pointed and tapered head 39 to spread apart the trip-arms 43, thereby disengaging their hooks from the projections on the swinging doors 46, allowing them to be opened by the weight of the cotton. As they open they cause the doors of the outer casing to also swing open and allow the cotton to fall from the weighing-receptacle into a bin, gin, or other desired point. By then lifting the rod 30 through the handle 33 the valve 10 can be opened, and through the pawl 34 on the rod 30, engaging with the weighted-arm 27, the parts of the tripping device will be again brought into their normal position and the rod held up by the latch 28. As soon as the valve 10 is opened the rush of air into the bottom of the scale will tend to draw in and close the outer weighted doors 7, and these, together with the pneumatic action, will shut the doors 46 in the bottom of the weighing-box, and the same operation in weighing can be repeated.

This machine is adapted for continuous or occasional weighing, but is more suitable for the latter use, such as tolling cotton that is to be ginned, where, for instance, the pneumatic pipe-conveyer would lead from a point where the cotton was unloaded to the gin and the scale connected to the pneumatic pipe at any desired intermediate point. When a certain amount of cotton was to be ginned, the scale would be set to the point representing the amount of toll, and the first cotton passing through the pipe would fall in the weighing-receptacle, which when full would operate through its connections to cut off the supply and empty itself. After the amount of cotton representing the toll has been taken out of the cotton to be ginned the valve to the scale would be closed and the remainder of the cotton passing through the conveyer would be carried to the gin. When another lot was to be ginned, the scale would be set to the point representing the amount of toll, and by opening the valve 10 through the rod 30 the operation just described could be repeated.

The slot in the outer casing may be covered with rubber secured at the sides, if desired, to prevent all leakage, the two parts overlapping in the middle and the scale-beam working between. The slot would thus be always closed; but the leakage is so small that this is not essential.

While the scale herein shown is adapted more especially for suction-conveyers, it can be used equally as well in connection with a blower-conveyer, for by increasing the weights on the arms of the hinged doors just sufficient to overcome the air-pressure in the casing above they would remain shut while the weighing receptacle was filling and would readily open when the weight of the cotton fell upon them.

Other changes and modifications can be made in my weighing apparatus without changing its operation or departing from the spirit of my invention.

Having thus fully described my invention, what I claim as new, and desire to secure by Letters Patent, is—

1. In combination with a pneumatic conveyer, a closed casing connected thereto, a weighing apparatus therein whose receptacle is in communication with said pneumatic conveyer and receives cotton or other product therefrom, doors at the bottom of said weighing receptacle, automatic means opening said doors, and doors at the bottom of the casing adapted to be opened by the weight of the discharged product.

2. In combination with a pneumatic conveyer, a closed casing connected thereto, a weighing apparatus therein whose receptacle is adapted to receive cotton or other product from the conveyer, a valve for cutting off the supply of cotton, connections for opening the weighing receptacle when the scale of the weighing apparatus is tipped, and doors in the casing adapted to be opened by the weight of the discharged product.

3. In combination with a pneumatic conveyer, a closed casing connected thereto, a weighing apparatus therein whose receptacle is adapted to receive cotton or other product from the conveyer, connections for opening the weighing receptacle when the scale of the weighing apparatus is tipped, and doors in the casing adapted to be opened by the weight of the discharged product.

4. In combination with a pneumatic conveyer, a closed casing connected thereto having doors normally held closed, a weighing apparatus in such casing whose receptacle is adapted to receive cotton or other product from the conveyer, a valve for cutting off the supply of cotton, doors in the casing adapted to be opened by the weight of the discharged product, and valve connections for turning on the supply of cotton from the conveyer to the weighing receptacle.

5. In combination with a pneumatic conveyer, a closed casing connected thereto, a weighing apparatus therein whose receptacle is adapted to receive cotton or other product from the conveyer, a valve between such conveyer and receptacle, doors in such receptacle, actuating connections between such doors and said valve, valve-operating devices between the scale of the weighing apparatus and the said valve, whereby when the scale of the weighing apparatus is tipped such doors will be opened and such valve be closed, and doors in the bottom of said casing adapted to be opened by the discharged product.

6. In combination with a pneumatic conveyer, a closed casing connected thereto, a weighing apparatus therein whose receptacle is adapted to receive cotton or other product from the conveyer, a suitable valve between said conveyer and receptacle, doors in such receptacle and casing, actuating connections between the doors of such receptacle and the conveyer valve for opening such doors as the valve is closed, the doors of the casing being opened by the weight of the discharged product, and resetting means operated at will for again putting the weighing apparatus into operation and opening the conveyer valve.

In testimony whereof I have hereunto set my hand and affixed my seal, this 3d day of October, 1894, in the presence of the two subscribing witnesses.

ANDREW SCHULZE. [L. S.]

Witnesses:
JOHN F. GREEN,
E. E. VERNELL.